United States Patent [19]

Proctor et al.

[11] Patent Number: 4,513,578
[45] Date of Patent: Apr. 30, 1985

[54] WEIGHT-MONITORED AIR-CONDITIONER CHARGING STATION

[75] Inventors: Robert H. Proctor, Cockeysville; Arthur G. Hobbs, Jr., Hampstead, both of Md.

[73] Assignee: Murray Corporation, Cockeysville, Md.

[21] Appl. No.: 497,167

[22] Filed: May 23, 1983

[51] Int. Cl.³ .............................................. F25B 45/00
[52] U.S. Cl. ...................................... 62/149; 62/292; 62/126
[58] Field of Search .................. 62/149, 174, 292, 77, 62/126, 127, 468, 192

[56] References Cited

U.S. PATENT DOCUMENTS

| | | | |
|---|---|---|---|
| 2,325,844 | 8/1947 | Spaulding | 249/2 |
| 2,499,170 | 2/1950 | Shoemaker | 62/149 |
| 2,746,258 | 5/1956 | Hagans | 62/292 X |
| 3,076,319 | 2/1963 | White | 62/149 |
| 3,695,055 | 10/1972 | Bruce | 62/292 X |
| 3,785,163 | 1/1974 | Wagner | 62/77 |
| 3,813,893 | 6/1974 | Gemender et al. | 62/129 |
| 3,873,289 | 3/1975 | White | 62/149 |
| 4,245,480 | 1/1981 | Saunders | 62/149 |
| 4,261,178 | 4/1981 | Cain | 62/149 |
| 4,285,206 | 8/1981 | Koser | 62/149 X |
| 4,364,236 | 12/1982 | Lower et al. | 62/77 |

*Primary Examiner*—Harry Tanner
*Attorney, Agent, or Firm*—Irvin A. Lavine

[57] ABSTRACT

A mobile air-conditioner charging station having a reluctance-type weighing scale on which are mounted reservoirs of both lubricant oil and refrigerant. A computer module reads the weight loss of the combined reservoirs as, first, the oil is charged into the air-conditioner and then, sequentially and automatically, the refrigerant is charged into the air-conditioner. Each charging cycle is completed when the computer module senses, by a plurality of discrete readings of the scale at timed intervals, that a pre-selected magnitude of weight loss has occurred and has been maintained.

12 Claims, 3 Drawing Figures

U.S. Patent  Apr. 30, 1985  4,513,578
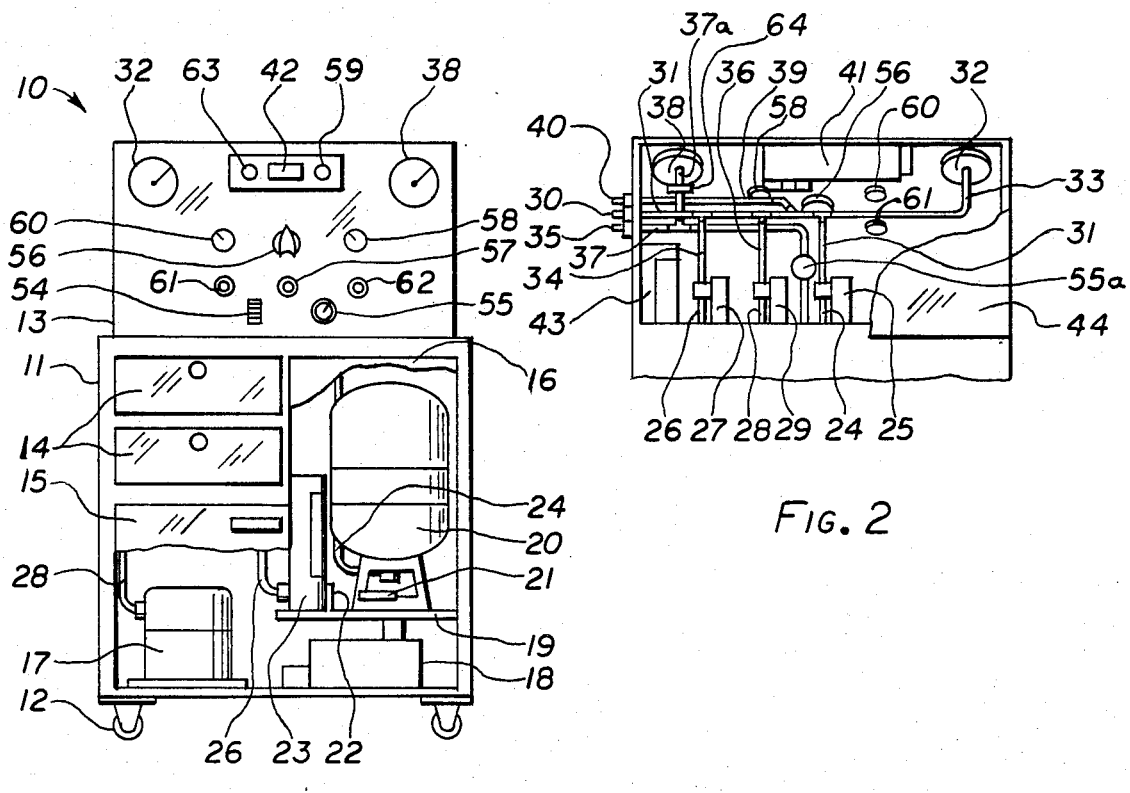
FIG. 1
FIG. 2
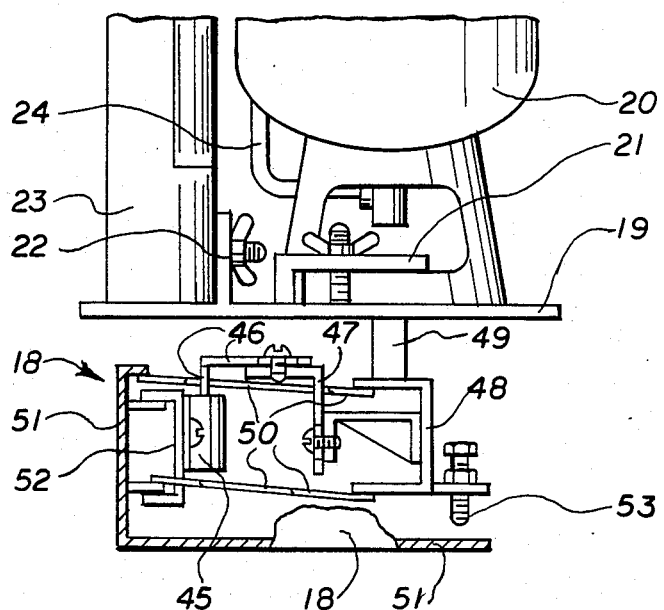
FIG. 3

WEIGHT-MONITORED AIR-CONDITIONER CHARGING STATION

BACKGROUND OF THE INVENTION

The invention relate generally to the field of refrigeration systems and, more specifically, to the charging or recharging of such systems with refrigerant and lubricant, particularly automotive air-conditioning systems.

With the increased popularity of air-conditioning systems in vehicles, the necessity for charging or recharging such systems has become a common function of automotive service stations and garages. To this end, charging stations or service units have been developed over time in an effort to reduce the manhours required for the charging sequence and to improve the reliability and accuracy of the charging sequence. The objective has been to divorce the procedure from the requirement for skilled experts and permit its use by general automotive mechanics, and to free the serviceman from a routine, time-consuming task for much more productive effort.

Accordingly, in the early days of the charging art, elaborate manuals were prepared for the re-charging procedure. As the art developed, attempts have been made to effect constant-flow metering of the charge in association with timers, as well as the provision of visual forms of indicators denoting attainment of a desired condition in the re-charging cycle. This has been accompanied by the development of the aforesaid charging stations in the form of compact, mobile units which contain and dispense lubricant and refrigerant.

The progress of the art over the past 25 years is exemplified in Shoemaker, U.S. Pat. No. 2,499,170; White, U.S. Pat. No. 3,076,319; Wagner, U.S. Pat. No. 3,785,163; Gemender et al, U.S. Pat. No. 3,813,893; and White, U.S. Pat. No. 3,873,289.

Shoemaker U.S. Pat. No. 2,499,270, supplies a predetermined weight of oil and refrigerant to a reservoir for injection into the refrigeration system after evacuation. Wagner U.S. Pat. No. 3,785,163, uses a change of state, from liquid to saturated vapor, for the refrigerant to provide visual indication when an optimum charge has been attained. Gemender et al, U.S. Pat. No. 3,813,893, use a thermostatically controlled valve and a restricted rate of refrigerant flow to permit control of the charge.

White, U.S. Pat. No. 3,076,319, automates the charging sequence by utilizing pressure-responsive elements and a stepper switch. White, U.S. Pat. No. 3,873,289, controls refrigerant flow rate by pressure drop through a restricted orifice and uses timers for sequencing.

It will be noted that the later patentees have found serious disadvantages in the introduction of a pre-weighed quantity of refrigerant and oil into the air-conditioner system, as disclosed by Shoemaker. Therefore, the later patentees have developed other systems of timed injection or pressure-responsive control which do not relate directly to the weight of refrigerant or of oil, despite the fact that weight is the most desirable measure, as it is substantially free of variations resulting from temperature or pressure changes and is consistent with design criteria and specifications.

The present invention avoids the disadvantages of the Shoemaker disclosure by dealing with weight differentials of large reservoirs rather than dealing with the weight of a discrete charge itself. The present invention apparatus avoids the disadvantages and inaccuracies of the later systems, which are not directly related to weight of charge, by directly using weight as the ultimate measure of the desired charge.

SUMMARY OF THE INVENTION

It is the primary object of the invention to provide an improved automated charging station of high accuracy and reliability.

Another object of the invention is to utilize differential weight sensing means to dispense precise quantities of refrigerant and oil from storage reservoirs.

A further object of the invention is to introduce safeguards into the automatic sequencing of the charging process, by sensing and signalling aberrant conditions.

Other objects and advantages of the invention will appear more fully in the course of the following description.

BRIEF DESCRIPTION OF THE DRAWING

FIG. 1 is a front elevation of a charging station embodying the features of the invention, portions thereof being broken away to show the interior storage area.

FIG. 2 is a fragmentary rear elevation of the upper portion of the charging station, with the access panel broken away to show the disposition of certain valves and other components.

FIG. 3 is a side elevation of a weighing scale utilized in the invention, portions thereof being broken away to show greater detail.

BRIEF DESCRIPTION OF THE PREFERRED EMBODIMENT

Referring to FIGS. 1 and 2 of the drawing, there is shown a charging station 10 which includes a storage cabinet 11, mounted for mobility on casters 12, and surmounted by a control panel 13.

The cabinet 11 is provided with optional storage drawers 14 and with hinged doors 15 and 16 which provide access to the interior of the cabinet, when opened. In FIG. 1, portions of these doors have been broken away to show a motorized vacuum pump unit 17 mounted interiorly of the cabinet on one side of the base thereof. On the other side of the base of the cabinet interior there is mounted a weighing scale 18 having a platform 19 on which is secured a pressurized refrigerant canister or reservoir 20 by means of a suitable detachable bracket assembly 21. Also mounted on the platform 19 and secured thereto by a suitable detachable bracket assembly 22 is a pressurized oil cylinder or reservoir 23. Each of the canisters is provided with its own conventional shut-off valve (not shown) which, when opened, permits the refrigerant reservoir to communicate through hose 24 with a solenoid valve 25 and permits the oil reservoir to communicate through hose 26 with a solenoid 27. A hose 28 provides communication from the vacuum pump to a solenoid valve 29.

As best seen in FIG. 2, the valve 25 communicates with a charging port 30 through conduit 31 and communicates with a low pressure gauge 32 through conduit branch 33.

The valve 27 is provided with a conduit 34 by means of which the pressurized oil can also be directed to the charging port 30, by joinder with the refrigerant conduit 31.

The evacuation valve 29 also communicates with port 30 through a conduit 36, by joinder with the refrigerant conduit 31.

A high pressure port 35 is provided for connecting a hose to the high pressure side of the refrigeration system being serviced. A high pressure conduit 37 leads from this port 35 to the interior of the storage cabinet 11. A conduit beam 37a connects the high pressure conduit 37 to a high pressure gauge 38. Operationally, the high pressure conduit 37 is used for "dumping" the fluid contents of the air conditioner being serviced prior to evacuation, through a valve 55a, as well as for monitoring system pressure via gauge 38 during charging.

Optionally another low pressure conduit 39, branching from the refrigerant conduit 31, can be provided for communication with an accessory port 40 for non-automated low pressure discharge, such as pressurizing the oil cylinder or discharging a small canister.

An electronic computer module 41 which incorporates a microprocessor sequencing unit is operatively connected to the various components previously described, receiving signals from scale 18 and manual controls, and sending signals to control valves; the sequencing unit also serves to energize a digital weight differential display 42 on the control panel 13.

An electronic signal in the form of a buzzer or beeper array 43 is also mounted on the interior of the control panel and operatively connected to the module 41.

A removable access cover 44 is secured to the back of the control panel. In FIG. 2 large portions of the panel 44 have been broken away to show the above-described component locations.

As best shown in FIG. 3 of the drawing, the weighing scale 18 is of the type which produces an output signal proportional to weight; preferably, it is of the electrical reluctance type which utilizes a current-carrying coil 45 and a movably-mounted metal armature 46 projecting into the center of the coil. The armature 46 is secured by an adjustable support bracket assembly 47 to a U-shaped scale beam 48 to which the platform 19 is fixedly secured by a post 49.

The beam 48 is yieldably mounted by a parallelogram arrangement of leaf springs 50. Two horizontally-spaced parallel leaf springs 50 extend horizontally from the upper portion of the beam to securement with the upper portion of an L-shaped base 51. Another pair of spaced parallel leaf springs 50 extend horizontally from the lower portion of the beam, parallel to the upper springs 50, to the lower portion of the base 51. The base 51 also serves as an anchor for a coil support member 52 to which the coil 45 is fixedly secured.

The resilient parallelogram mounting of the beam 48 permits substantially linear movement of the beam in response to changes in load on the platform 19. The movement of the beam is directly transmitted to the armature or transducer 46 and the electromagnetic changes effected by its interaction with the coil 45 are transmitted to and sensed by the computer module 41. An adjustable stop 53 is mounted on the beam 48 for abutment with the base 51, so as to limit movement of the beam to its operating range and prevent excessive distortion or deformation of the movable beam assembly.

The operation of the charging station is as follows, using the microprocessor sequencing unit of electronic computer module 41 and the manual controls are illustrated in FIG. 1 of the drawing. Basically, the re-charging procedure consists of emptying and evacuating the air-conditioning or refrigerating apparatus, as necessary, then charging lubricating oil into the apparatus, and then charging refrigerant into the apparatus. The detailed hook-ups and quantities for accomplishing the foregoing are well-known in the art and therefore require no further explanation.

As best seen in FIG. 1, the control panel 13 carries an "on-off" power switch 54 which is manipulated to energize the charging station's electrical and electronic components from a conventional power source. There is also a bleed valve control knob 55 which is turned to open valve 55a to discharge or "dump" the fluid contents of the air-conditioner through the high pressure conduit 37 before evacuation. A discharge catch tray (not shown) is provided under the cabinet base, equipped with steel wool to entrap the oil carried with the discharging refrigerant.

A vacuum timer 56, calibrated in minutes, serves to hold open the solenoid valve 29 for a selected time interval. The vacuum pump 17 will operate during the selected time interval, nominally ten minutes for the usual size of passenger vehicle air-conditioner, and then evacuation should be complete, as evidenced by a reading of 30 inches Hg on the low pressure gauge 32. During evacuation, no other functions of the charging station will be performed, even though charging quantities have been pre-set for the oil and refrigerant charges. An indicator 57 remains lighted until the timed evacuation is completed.

The charging settings can be selected either during evacuation or upon completion of evacuation, as desired. First, a setting knob 58, which is calibrated in pounds, is set to the selected weight of refrigerant to be charged. As this control knob is manipulated, the changing settings are visible in the digital display 42, in pounds and ounces avoirdupois, accurate to 0.2 ounces, so that an extremely precise setting to a decimal fraction of an ounce can be established. When the desired setting is achieved, a set button 59 is momentarily depressed to feed this setting to the computer memory, which acknowledges receipt by initiating an audible "beep". As will appear more fully hereinafter, the button 59 also serves as a sequence interrupter during the charging cycles. The operation of the set button 59 clears the refrigerant setting from the digital display 42.

Thereafter, another setting knob 60, calibrated in fluid ounces, is set to the desired volume of oil to be charged, which is similarly displayed in ounces on the digital display 42. When the desired oil setting is achieved, a "Start" switch or button 63 on the control panel is momentarily depressed to feed this setting to the computer memory. Receipt of the oil setting is acknowledged by an audible "beep".

If it is desired to charge the air-conditioner only with refrigerant, but not with oil, a zero setting is used for the oil. Similarly, if it were desired to charge only oil, but not refrigerant, a zero setting would be used for the refrigerant.

If the refrigerant and oil charge setting have been made during the timed evacuation interval, then upon completion of evacuation, the signal light 57 goes out, a "beep" signal is heard, an oil charge signal 61 is actuated, the solenoid valve 27 opens, and oil under pressure is automatically charged into the air conditioner. During this oil charging cycle, the digital display 42 will continually be changing to reflect the remaining quantity of charge yet to be made; i.e., the digital display approaches a zero reading as the computer monitors the weight loss indicated by weighing scale 18.

It is to be noted that it has become a standard practice in the art to use fluid ounces as the quantitative measure of the oil charge. In order to conform to this practice, the oil charge is set and displayed in fluid ounce measure. However, as the scale 18 senses only weight, the computer module is programmed to convert the oil charge setting to ounces of weight and monitors the charge in a weight-equivalent to the fluid ounce setting.

When a zero reading is attained on the display 42, indicating that the desired weight-equivalent charge of oil has been dispensed, the solenoid valve 27 closes. However, the computer module continues to monitor the scale 18 at short intervals, e.g. 1½ seconds, several times, say five times, to confirm that the scale 18 is stable and that the zero reading is, in fact, true. If a false zero reading has been momentarily attained as a result of scale 18 being disturbed by movement of the charging station or by someone or something bumping into it, then the zero reading will not be confirmed and solenoid valve 27 will open again to continue the oil charge until a true zero reading, indicating completion of the charge, is attained, and valve 27 closes.

After completion of the oil charge, an automatic short timed pulse of chase refrigerant is directed through hose 24, conduit 31, and out port 30 to clear the lines of retained or residual oil, so that the full charge of oil is dispensed into the air-conditioner. Signal light 61 is extinguished, and a "beep" sound is heard signalling completion of the oil charge cycle and automatic starting of the refrigerant charge cycle.

At the initiation of the refrigerant charge cycle, the digital display 42 is cleared and the previously set selected weight of refrigerant charge is displayed. A visual signal 62 lights up and solenoid valve 25 opens to charge pressurized refrigerant into the air-conditioner.

In the same manner explained above, the computer module monitors the weight loss on scale 18, continuously indicates on the display 42 the remaining weight of refrigerant yet to be dispensed, confirms the zero reading by repeated discrete monitoring of scale 18 at short time intervals, reopens valve 25 to continue dispensing if a false zero reading was indicated by scale 18, and finally closes valve 25, de-energizes signal light 62, and sounds an audible "beep" signal that the operation has been completed.

It will be noted that the charging cycles for the oil and refrigerant are completely automatic and are initiated by completion of the evacuation cycle, so that all three phases of the operation are automatic once the quantity settings have been made and the evacuation cycle started.

There may be circumstances when it is considered desirable to complete the evacuation cycle and visually monitor the readings on the low pressure gauge 32, without automatically initiating the subsequent charging cycles. If such is desired, then the operator simply postpones entering the oil and refrigerant quantity settings until after evacuation has been satisfactorily completed. The charging cycles are then initiated by momentary depression of the "Start" button 63 on the control panel, and the automatic operation commences.

There may also be circumstances when it is considered desirable to omit the evacuation cycle. In such cases the operator proceeds directly to making the refrigerant and oil quantity settings. The charging cycles are then initiated by momentary depression of the "Start" button 63, and automatic operation commences.

Whether the charging cycles are automatically initiated upon completion of the evacuation cycle, or directly initiated independently of evacuation by pressing button 63, the computer module 41 is programmed to start reading or monitoring the load on scale 18 at the start of the oil charging cycle, not sooner. Thus, any inaccuracy or changes in the scale readings which may occur due to metal fatigue or temperature drift in the scale 18 over a period of time, or even in the relatively short time span of the evacuation phase, are ignored and eliminated. Thereby, the measure of charge, as determined by the targeted weight loss or load differential on scale 18, can be attained with extreme accuracy.

The computer module 41 not only continuously monitors the weight loss on scale 18 during each of the charging cycles, it also monitors the rate of weight loss so that any interruption or excessive slowdown in the transfer of the charge to the air-conditioner causes an audible "beep" alarm signal to be sounded. Such restriction or interruption of flow to the air-conditioner is ordinarily the result of an inadequate supply of pressurized oil or refrigerant in the charging reservoirs 20 or 23 or may result from the existence of an inadequate pressure differential between the charging system and the air-conditioner.

When this distinctive alarm is sounded, the operator can visually observe which charging cycle, whether oil or refrigerant, is affected by noting which signal light 61 or 62 is lit. The operator can then place the entire charging system in "Hold" status, by momentarily depressing switch button 59—which will cause closing of the solenoid valve 25 or 27, as the case may be. The operator can then check the pertinent reservoir 20 or 23 and replace it, if necessary, with a full canister. It will be apparent that this replacement will establish an entirely new and different load or weight on scale 18. But, inasmuch as the charging system herein described monitors loss of weight on scale 18 rather than weight directly, when the charging cycle is removed from "Hold" and restarted by momentary depression of button switch 63, the computer module 41 continues its monitoring at exactly the same point in the cycle where it was placed on "Hold". Thus, the computer module will concern itself only with the remaining weight differential required to complete the charge, despite the intervening change in load on scale 18; no re-setting of the quantity of charge is required. Similarly, any adjustments required to be made to the air-conditioner to correct the inadequate pressure differential problem will not require re-setting of the charge quantities to re-start the charging cycles from the point of interruption.

For example, it has been determined that the flow interruption alarm should be actuated if the charging rate of oil is more than 30 seconds per ounce or if the charging rate of refrigerant is more than one minute per pound, although other perameters could be established, as desired, and programmed into computer module 41.

Additional safety features for the charging system relate to excessive discharge pressure and to inadvertent start-up of the vacuum system during operation of a charge cycle. If the vacuum timer 56 is manipulated during a charging cycle, an alarm sounds and the charging cycle is automatically terminated. Similarly, if the discharge pressure reaches a dangerous level, e.g., 275 psi, as sensed by a high pressure cut-out switch 64, the alarm sounds and the charging cycle is automatically terminated. In either circumstance, the situation must be investigated and corrected. Then the whole operative cycle of the charging station must be re-initiated, including the steps of setting the quantities of oil and refrigerant to be charged into the air-conditioner.

It is to be understood that the above-described embodiment of the invention is a preferred example of the same and that various changes and modifications may be made without departing from the spirit of the invention or the scope of the subjoined claims.

Having thus described our invention, we claim:

1. In an air-conditioner charging station, the combination of:
   (a) a powered vacuum pump for evacuation of an air-conditioner;
   (b) a reservoir of oil under pressure,
   (c) a reservoir of refrigerant under pressure,
   (d) conduit means and electrically operated valve means for selectively connecting said pump and each of said reservoirs to the air-conditioner to be serviced,
   (e) weighing means, common to both said reservoirs, for sensing the combined weight thereof and for producing an output signal proportional to the combined weights of said reservoirs,
   (f) electronic sequencing means operatively associated with said valve means and said weighing means for receiving said output signal for monitoring weight loss from said reservoirs as oil or refrigerant is discharged therefrom and for generating signals for controlling said valve means,
   (g) adjustable weight differential input means operatively connected to said sequencing means for introducing into said sequencing means selected values representative of preselected weight of refrigerant and oil to be discharged from said reservoirs, and
   (h) means for initiating operation of said sequencing means to receive and monitor said weighing means output signal and to provide signals to said control valve means for sequentially charging a preselected weight of oil from said oil reservoir and then a preselected weight of refrigerant from said refrigerant reservoir into the air-conditioner.

2. A combination as defined in claim 1, and further including means responsive to completion of said oil charge for initiating a short timed pulse of refrigerant charge to chase residual oil from said charging station into the air-conditioner.

3. A combination as defined in claim 1, and further including a digital visual display unit for said selected weight differential input means, and wherein said sequencing means senses the weight loss in said reservoirs during said charging cycles and said display unit continuously indicates said weight loss.

4. A combination as defined in claim 3, wherein said sensing of weight loss by said sequencing means is continuous until said preselected weight of charge is indicated as having been dispensed, and including multiple discrete sensing of said weight loss at timed intervals in response to completion of said continuous sensing, whereby to obtain confirmation of stabilized attainment of said pre-selected weight of charge prior to cessation of the charging cycle.

5. A combination as defined in claim 3, wherein said sequencing means senses both the weight loss and the rate of weight loss in said reservoirs, and including signal means actuated in response to a separate predetermined parameter of rate of weight loss for each of said reservoirs.

6. A combination as defined in claim 3, including manually-actuated interrupter means for said microprocessor sequencing means, whereby sequencing can be arrested at any step thereof and restarted from the point of arrest.

7. A combination as defined in claim 1, and further including a high pressure cut-out switch for sensing discharge pressure, said sequencing means generating signals for terminating charging upon sensing of a high pressure by said high pressure cut-out switch.

8. An air-conditioner charging station for charging refrigerant into an air-conditioner comprising:
   (a) a powered vacuum pump for evacuation of an air-conditioner,
   (b) a reservoir of oil under pressure,
   (c) a reservoir of refrigerant under pressure,
   (d) conduit means and electrically operated valve means for selectively connecting or disconnecting said vacuum pump and each of said reservoirs to the air-conditioner to be serviced,
   (e) weighing means for sensing the weight of said reservoirs and for substantially continually producing an output signal proportional thereto as weight is decreased during charging,
   (f) electronic sequencing means including adjustable oil and refrigerant preselected weight differential input means operatively associated with said valve means and said weighing means for receiving said output signal from said weighing means for monitoring weight loss as oil or refrigerant is discharged from a said reservoir into said air conditioner and for generating signals, including a signal to a said valve means for disconnecting a said reservoir from the air-conditioner upon receiving a signal indicating that the preselected weight of charge has been dispensed,
   (g) means for initiating operation of said sequencing means for sequentially charging a preselected weight of oil from said oil reservoir and then a preselected weight of refrigerant from said refrigerant reservoir into the air-conditioner,
   (h) said electronic sequencing means including means for sensing weight loss after the generation of said signal for disconnecting said reservoir at multiple discrete timed intervals and for generating a signal to the said valve means for connecting said reservoir to the air-conditioner upon receiving a signal indicating that a false signal of dispensed weight change was received,
whereby to obtain confirmation of stabilized attainment of said preselected weight change.

9. A combination as defined in claim 8, wherein said sequencing means senses rate of weight loss in said reservoirs, and including signal means actuated in response to a separate, predetermined parameter of rate of weight loss for each of said reservoirs.

10. A combination as defined in claim 9, and further including a high pressure cut-out switch for sensing discharge pressure, said sequencing means generating signals for terminating charging upon sensing of a high pressure by said high pressure cut-out switch.

11. An air-conditioner charging station for charging refrigerant into an air-conditioner comprising:
   (a) a powered vacuum pump for evacuation of an air-conditioner,
   (b) a reservoir of oil under pressure,
   (c) a reservoir of refrigerant under pressure,
   (d) conduit means and electrically operated valve means for selectively connecting or disconnecting said vacuum pump and each of said reservoirs to the air-conditioner to be charged, (e) weighing means for sensing the weight of said reservoirs and for substantially continually producing an output signal proportional thereto as weight is decreased during servicing, (f) electronic sequencing means operative associated with said valve means and said weighing means for monitoring weight loss and rate of weight loss as oil or refrigerant is discharged from a said reservoir into said air-conditioner, (g) adjustable weight differential input means operatively connected to said sequencing unit, (h) means for initiating operation of said sequencing means for sequentially charging a preselected weight of oil from said oil reservoir and then a preselected weight of refrigerant from said refrigerant reservoir into the air-conditioner, and (i) signal means actuated in response to a separate predetermined parameter of rate of weight loss for each of said reservoirs for indicating an inadequate supply of pressurized oil or refrigerant in the charging reservoirs or the existence of an inadequate pressure differential between the charging system and the air-conditioner.

12. A combination as defined in claim 11, and further including a high pressure cut-out switch for sensing discharge pressure, said sequencing means generating signals for terminating charging upon sensing of a high pressure by said high pressure cut-out switch.

* * * * *